(12) United States Patent
Suzuki et al.

(10) Patent No.: US 7,108,820 B2
(45) Date of Patent: Sep. 19, 2006

(54) RESIN MOLDED ARTICLE AND PRODUCTION METHOD THEREOF

(75) Inventors: Fumiyuki Suzuki, Kanagawa (JP); Tadashi Mochizuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 335 days.

(21) Appl. No.: 10/208,805

(22) Filed: Aug. 1, 2002

(65) Prior Publication Data

US 2003/0034587 A1 Feb. 20, 2003

(30) Foreign Application Priority Data

Aug. 1, 2001 (JP) ............. 2001-233943

(51) Int. Cl.
*B29C 45/16* (2006.01)
*B32B 27/04* (2006.01)

(52) U.S. Cl. ............. 264/235; 264/328.18; 428/299.1; 428/299.4

(58) Field of Classification Search ............. 528/361, 528/271; 264/235, 328.18; 359/619, 621, 359/622, 625, 626; 428/299.1, 299.4
See application file for complete search history.

(56) References Cited

U.S. PATENT DOCUMENTS

| | | | | | |
|---|---|---|---|---|---|
| 4,279,249 A | * | 7/1981 | Vert et al. | .............. | 606/77 |
| 4,994,551 A | * | 2/1991 | Fung et al. | .............. | 528/354 |
| 5,180,765 A | * | 1/1993 | Sinclair | .............. | 524/306 |
| 5,484,881 A | * | 1/1996 | Gruber et al. | .............. | 528/354 |
| 5,496,913 A | * | 3/1996 | Nishiguchi et al. | .............. | 528/198 |
| 5,773,562 A | * | 6/1998 | Gruber et al. | .............. | 528/354 |
| 5,844,068 A | * | 12/1998 | Otera et al. | .............. | 528/361 |
| 5,849,374 A | * | 12/1998 | Gruber et al. | .............. | 428/34.3 |
| 6,060,622 A | * | 5/2000 | Okuyama et al. | .............. | 562/589 |
| 6,087,465 A | * | 7/2000 | Seppala et al. | .............. | 528/80 |
| 6,111,060 A | * | 8/2000 | Gruber et al. | .............. | 528/354 |
| 6,140,458 A | * | 10/2000 | Terado et al. | .............. | 528/272 |
| 6,166,169 A | * | 12/2000 | Fritz et al. | .............. | 528/272 |
| 6,534,586 B1 | * | 3/2003 | Tsuji et al. | .............. | 524/553 |

FOREIGN PATENT DOCUMENTS

| | | |
|---|---|---|
| EP | 0 749 997 A2 | 12/1996 |
| EP | 0 805 182 A1 | 11/1997 |
| EP | 0 821 036 A1 | 1/1998 |

OTHER PUBLICATIONS

Hawley's Chemical Dictionary (12th ed.): definition of "talc".*
Rosato, Dominick V., Donald V. Rosato, and Marlene G. Rosato. Injection Molding Handbook (3rd ed.). Kluwer Academic Publishers, Boston. 2000. pp. 502, 503.*

* cited by examiner

*Primary Examiner*—Mark Eashoo
*Assistant Examiner*—Monica A Huson
(74) *Attorney, Agent, or Firm*—Sughrue Mion, PLLC

(57) ABSTRACT

A resin molded article and a production method thereof, including the processes of heat-molding a molding material containing a biodegradable resin and a reinforcing fiber or a biodegradable resin, a reinforcing fiber after controlling a water content thereof, or non-controlling. The resin molded article according to the present invention has sufficient heat resistance so that they are not deformed even after being temporarily left in a high temperature environment such as that in an automobile in the daytime in summer seasons and being heated to a high temperature, without deteriorating the properties thereof as members for recording materials, and therefore cause no environmental problems when left in nature since they can be finally decomposed by microorganisms.

26 Claims, 1 Drawing Sheet

RESIN MOLDED ARTICLE AND PRODUCTION METHOD THEREOF

BACKGROUND OF THE INVENTION

1. Field of the Invention

The present invention relates to resin molded articles and a production method therefor.

2. Description of the Related Art

In recent years, resin molded articles are used for many members and parts constituting industrial products. The resin molded articles are composed of various resin materials solely or in combination, and are molded into a required shape depending on a required function, performance, property, etc. For example, various kinds of resin molded articles have been used as functional members such as containers, casing, lids, spool cores and cassette cases, for accommodating, wrapping, covering, protecting, transporting, storing, shape retaining or otherwise handling recording materials such as photographic recording materials, magnetic recording materials and optical recording materials. For example, resin molded articles made from various resin materials are used as the functional members for accommodating the body of a recording material, such as cassettes, magazines, and film cases with lenses. The resin molded articles are also used for containers for simply protecting recording materials; housing cases for audiocassette tapes and videotapes; and holding cases for CD, MD, etc.

Few of the resin molded articles are permanently stored, but most of them will be disposed or will be classified and subjected to regeneration treatment if they are reusable, when the industrial products in which the resin molded articles have been incorporated, finish their role, or after the resin molded articles themselves have performed their function. For example, the resin molded articles such as various members or components that constitute the above-mentioned recording materials will be separated and discarded at the time of use or during use of the recording materials, or discarded together with the recording materials to be discarded.

However, conventional resin molded articles are difficult to be decomposed when they are disposed of in the natural environment. This is one of the factors that contaminate the environment.

Accordingly, in recent years, the uses of the materials that are decomposed under the natural environment have been studied. Biodegradable resins, which are known as resin materials decomposed under the natural environment, are inferior in heat resistance to the conventional plastics, so that they are deformed under conditions where the temperature increases to as high as that in a car in summer seasons and none of them can exert the function thereof. For example, it has become possible to mass-produce poly lactic acid originated from corn starch as a raw material at low cost. The poly lactic acid has attracted attention as a biodegradable resin that is friendly to the terrestrial environment since it is reusable to enable making effective use of resources and since even if it is discarded, it will be decomposed under natural environment and give no adverse influence to the environment.

However, the poly lactic acid shows considerable softening at above 60° C., since it has a low glass transition temperature of as low as 58° C., so that they are deformed under environmental conditions of high temperature, for example, as that in a car in summer seasons and thus it is difficult to utilize it for applications where heat resistance is required. Therefore, there has been a demand for the development of a technology that can utilize biodegradable resins such as poly lactic acid in molded articles of which heat resistance is required.

SUMMARY OF THE INVENTION

An object of the present invention is, while retaining necessary functions and performance required of resin members and components, to provide resin molded articles and a production method thereof that have sufficient heat resistance so that they are not deformed even after being temporarily left in a high temperature environment such as that in an automobile in the daytime in summer seasons and being heated to a high temperature, without deteriorating the properties required for each member, and that cause no environmental problems when left in nature since they can be finally decomposed by microorganisms.

Further, a second object of the present invention is to provide a resin molded article that uses poly lactic acid as a biodegradable resin to retain various functions and performances required for a resin molded member and component, which is not deformed or deteriorated in the performances required for each member when temporarily left to stand in a high temperature environment such as in an automobile in a daytime in summer seasons and heated to a high temperature, because of having sufficient heat resistance, and which is ultimately decomposed by microorganisms even when left to stand in nature, without causing any problem on the environment, and also to provide a production method thereof.

In order to attain the above-mentioned object, a first aspect of the present invention provides a production method for a resin molded article, including the processes of heat-molding a molding material containing a reinforcing fiber and a biodegradable resin to obtain a molded article having a temperature-lowering crystallization peak temperature of in a range of 80 to 120° C., and subjecting the molded article to an annealing treatment at 80 to 165° C. for 0.1 to 30 minutes.

In order to attain the above-mentioned object, a second aspect of the present invention provides a resin molded article obtained by controlling a molding material containing poly lactic acid having a weight average molecular weight of 50,000 or more and less than 120,000 and an L-lactic acid with optical purity of 95% or more, a reinforcing fiber in a mass ratio of poly lactic acid/reinforcing fiber of 95/5 to 50/50 so as to have a water content of less than 200 ppm, and then injection molding the molding material and further crystallizing it by annealing treatment.

In order to attain the above-mentioned object, a third aspect of the present invention provides a resin molded article obtained by controlling a molding material containing poly lactic acid having a weight average molecular weight of 50,000 or more and less than 120,000 and an L-lactic acid with optical purity of 88% or more, a reinforcing fiber and a nucleating agent in a mass ratio of poly lactic acid/reinforcing fiber/nucleating agent of 95/5/0.01 to 50/50/10 so as to have a water content of less than 200 ppm, and then injection molding the molding material.

In order to attain the above-mentioned object, a fourth aspect of the present invention provides a resin molded article obtained by controlling a molding material containing poly lactic acid having a weight average molecular weight of 120,000 or more and less than 200,000 and an L-lactic acid with optical purity of 88% or more, a reinforcing fiber and a nucleating agent in a mass ratio of poly lactic acid/ reinforcing fiber/nucleating agent of 95/5/0.01 to 50/50/10 so as to have a water content of 200 to 1,500 ppm, and then injection molding the molding material.

In order to attain the above-mentioned object, a fifth aspect of the present invention provides a resin molded article obtained by controlling a molding material containing poly lactic acid having a weight average molecular weight of 120,000 or more and less than 200,000 and an L-lactic acid with optical purity of 95% or more, and a reinforcing fiber in a mass ratio of 95/5 to 50/50 so as to have a water content of 200 to 1,500 ppm, and then injection molding the molding material and further crystallizing it by annealing treatment.

DESCRIPTION OF THE PREFERRED EMBODIMENTS

Figure 1:
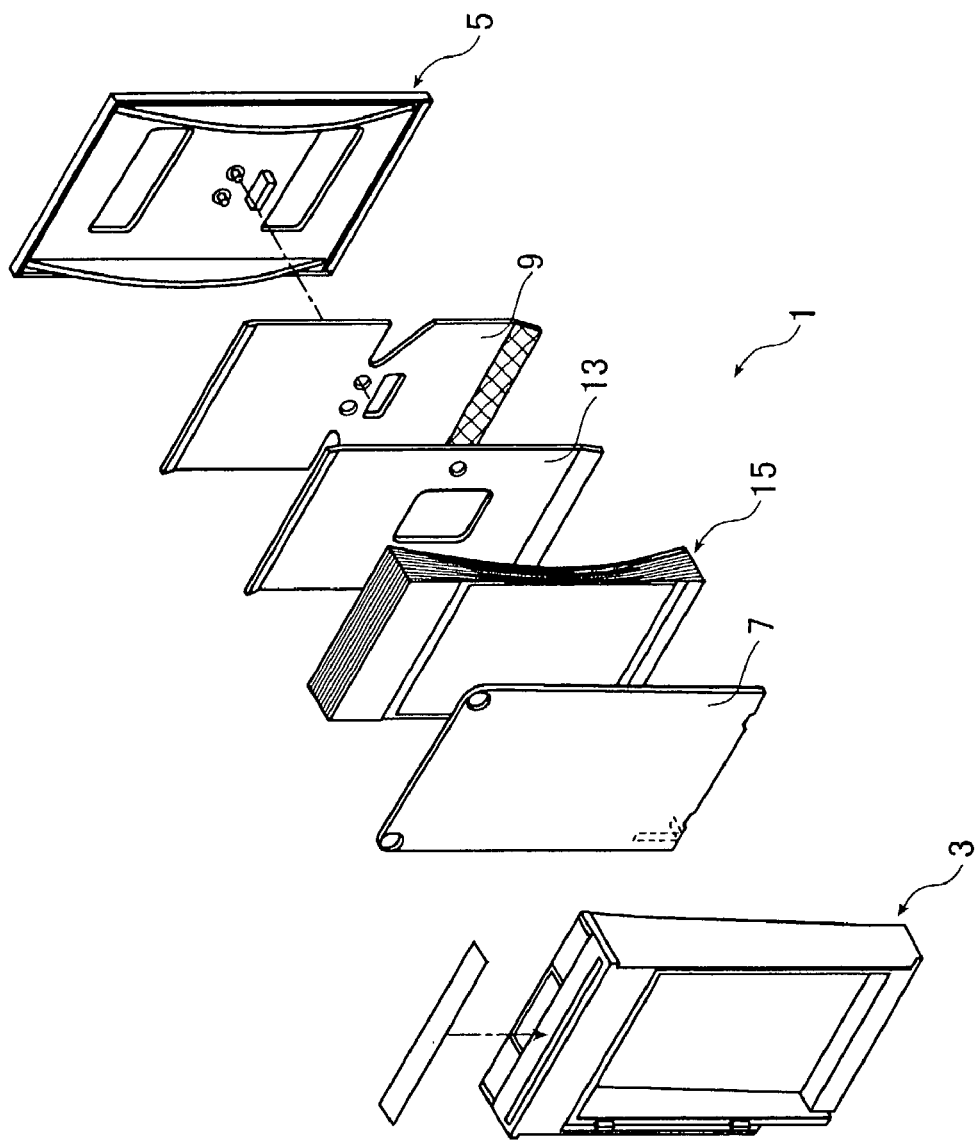
FIG. 1 is an exploded perspective view illustrating component members of an instant film pack assembled in accordance with one embodiment of the present invention.

Hereinafter, a resin molded article and a production method thereof according to the present invention will be described in detail.

The term "resin molded article" as used herein refers to structural members that constitute a functional material; containers, lids and the required accessories thereof used for accommodating, wrapping, covering, protecting, transporting, storing, shape supporting, or the like; or molded articles molded in order to mount the functional material and cause it to exhibit its function. Examples of the functional material include various kinds of recording materials and the like. The recording materials include, for example, photographic sensitive materials such as negative films, reversal films, photographic printing papers, and mono-sheet or peel-apart type instant photographic films; audiocassette tapes; magnetic recording materials such as videocassette tapes, floppy disks, and magnetic tapes for recording computer data; and optical recording materials such as CD, CD-R, CD-RW, DVD, DVD-R, DVD-RW, and MD.

As specific examples of the resin molded members, the term "resin member for recording materials" as used herein refers to containers, lids and the required accessories thereof used for accommodating, wrapping, covering, protecting, transporting, storing, shape supporting, or the like; or various members for mounting the recording material and causing it to exhibit its function. Specifically, in the case of photographic sensitive materials, the term refers to various members including a container, body, lid or spool for negative or reversal films of various standards such as 135, 110, 120, and 220; or component members of instant films such as a case for packing films (for example, component members such as a container body, a light-shielding sheet, an elastic plate, a flexible light-shielding sheet, a light-shielding piece, and a bottom light-shielding sheet), casing of a film with a lens, a mechanical component, and the like. In the case of magnetic recording materials, the term refers to cassette casing and components thereof for accommodating audiocassette tapes, videocassette tapes, magnetic tapes for recording computer data, floppy disks, etc.; and cases for accommodating them. Furthermore, in the case of optical recording materials, the term refers to cassettes of MD and cases for accommodating CD, CD-R, CD-RW, DVD, DVD-R, DVD-RW, MD, etc.

The molding material for forming the resin molded articles of the present invention includes a biodegradable resin and a reinforcing fiber as essential component. Examples of the biodegradable resin include poly lactic acid, polybutylene succinate, polyethylene succinate, modified polyethylene terephthalate, polyhydroxy butyrate, modified starch, polycaprolactone, and the like. These may be used singly or two or more of them may be used in combination. Among these, biodegradable resins containing poly lactic acid as a main ingredient are preferred. For example, those containing 50 mass % or more of poly lactic acid are preferred based on the total biodegradable resin.

The poly lactic acid used as a main component of the biodegradable resin may be a homopolymer of L-lactic acid, a copolymer of L-lactic acid and D-lactic acid, a copolymer of L-lactic acid and hydroxycarboxylic acid, or a mixture thereof. Examples of the hydroxycarboxylic acid include glycolic acid, 3-hydroxybutyric acid, 4-hydroxyvaleric acid, 6-hydroxycaproic acid, and the like. Poly lactic acid generally consists of optical isomers such as a D-lactic acid and an L-lactic acid. Only the L-lactic acid is biodegradable. Industrially, poly lactic acid is prepared by subjecting starch, which is a natural substance, to lactic acid fermentation to obtain lactic acid and polymerizing it. During this process, an isomerization reaction occurs. Therefore, usually lactic acid contains a small amount of the D-lactic acid as an impurity. Since a higher content of the D-lactic acid, i.e., a lower purity of L-lactic acid, results in inhibition of the crystallization of poly lactic acid, it is desirable that poly lactic acid used in the present invention includes L-lactic acid with optical purity of 88% or more. It is more desirable that the optical purity is 95% or more, specifically, 97% or more.

Specific examples of the poly lactic acid include the one commercially available from Mitsui Chemical, Inc. under the trade name: LACEA.

In the present invention, examples of the reinforcing fiber, i.e., the other essential component of the molding material, include inorganic fibers such as glass fibers, carbon fibers, silicon carbide fibers, alumina fibers, and silicon nitride fibers, and organic fibers such as aramid fibers. These may be used singly or two or more of them may be used in combination. Among these, glass fibers and carbon fibers are preferred since they are readily available.

It is preferred that the reinforcing fiber has a fiber length of 5 mm or less, an aspect ratio of 1,500 or less, and a cross-sectional area of $2.7 \times 10^{-4}$ mm$^2$ or less.

Further, it is preferred that in order to increase compatibility with poly lactic acid, the reinforcing fiber is subjected to surface treatment with silane coupling agents, titanium coupling agents, aluminate coupling agents, zirconium coupling agents, fatty acid coupling agents, oils and fats, waxes, surfactants, etc.

In the present invention, the reinforcing fiber is effective in improving the heat resistance and rigidity of the resin molded article of the present invention and it is preferred that the reinforcing fiber is blended in a mass ratio of biodegradable resin (particularly poly lactic acid)/reinforcing fiber of 95/5 to 50/50, particularly preferably 92/8 to 65/35. If the ratio of the reinforcing fiber is less than 5 mass part per 100 mass parts of the sum of the resin and the reinforcing fiber, the effect of reinforcement by the addition is little while if the ratio of the reinforcing fiber exceeds 50 mass parts per 100 mass parts of the sum of the resin and the reinforcing fiber, there is a fear that the molded article to be obtained will become brittle. The reinforcing fiber is effective in preventing the contraction when anneal treatment is performed after molding or in preventing deformation due to its own weight. It is preferred that the resin molded member contains the reinforcing fiber in a proportion of 5 to 30 mass %, particularly 10 to 20 mass %, based on the sum of the biodegradable resin and the reinforcing fiber. If the content of the reinforcing fiber is less than 5 mass %, the reinforcing effect will be little while if it exceeds 30 mass %, there is a fear that the obtained member will become brittle.

In the present invention, further addition of nucleating agents to the biodegradable resin and reinforcing fiber gives rise to a molded resin article having practically sufficient mechanical strength due to crystallization of the obtained resin molded article. It is effective that the nucleating agent is added to the molding material, when controlling the molding material containing the poly lactic acid having weight average molecular weight of 50,000 to 200,000 and optical purity of L-lactic acid of 88% as a degadable resin, and the reinforcing fiber so as to have a water content of 1500 ppm or less, and then injection molding the molding material.

The nucleating agents can be roughly divided into inorganic nucleating agents and organic nucleating agents.

Examples of the inorganic nucleating agent include talc, kaolin, kaolinite, kaolin clay, barium sulfate, silica, calcium lactate, sodium benzoate, and the like.

Examples of the organic nucleating agent include: a sorbitol-based nucleating agents including dibenzylidene sorbitol, bis(p-methylbenzylidene)sorbitol, bis(p-ethylbenzylidene)sorbitol, etc.; hydroxy-di(t-butylbenzoic acid)aluminum; phosphorus-based nucleating agents including bis (4-t-butylphenyl)sodium phosphate, methylenebis(2,4-di-t-butylphenyl)phosphate salts, etc.; aliphatic polyester-based nucleating agents including laurates such as sodium laurate, potassium laurate, potassium hydrogen laurate, magnesium laurate, calcium laurate, zinc laurate, and silver laurate, myristates such as lithium myristate, sodium myristate, potassium hydrogen myristate, magnesium myristate, calcium myristate, zinc myristate, and silver myristate, palmitates such as lithium palmitate, potassium palmitate, magnesium palmitate, calcium palmitate, zinc palmitate, copper palmitate, lead palmitate, thallium palmitate, and cobalt palmitate, oleates such as sodium oleate, potassium oleate, magnesium oleate, calcium oleate, zinc oleate, lead oleate, thallium oleate, copper oleate, and nickel oleate, stearates such as sodium stearate, lithium stearate, magnesium stearate, calcium stearate, barium stearate, aluminum stearate, thallium stearate, lead stearate, nickel stearate, and beryllium stearate, isostearates such as sodium isostearate, potassium isostearate, magnesium isostearate, calcium isostearate, barium isostearate, aluminum isostearate, zinc isostearate, and nickel isostearate, behenates such as sodium behenate, potassium behenate, magnesium behenate, calcium behenate, barium behenate, aluminum behenate, zinc behenate, and nickel behenate, and montanates such as sodium montanate, potassium montanate, magnesium montanate, calcium montanate, barium montanate, aluminum montanate, zinc montanate, and nickel montanate, etc.; aliphatic monoalcohols; aliphatic polyalcohols; cyclic alcohols, and the like. For example, the aliphatic alcohol-based nucleating agents including aliphatic monoalcohols such as pentadecyl alcohol, cetyl alcohol, heptadecyl alcohol, stearyl alcohol, nonadecyl alcohol, eicosyl alcohol, ceryl alcohol, and melissyl alcohol, aliphatic polyalcohols such as 1,6-hexanediol, 1,7-heptanediol, 1,8-octanediol, 1,9-nonanediol, and 1,10-decanediol, cyclic alcohols such as cyclopentane-1,2-diol, cyclohexane-1,2-diol, and cyclohexane-1,4-diol, etc.; aliphatic carboxylate-based nucleating agents including aliphatic monocarboxylate such as cetyl laurate, phenacyl laurate, cetyl myristate, phenacyl myristate, isopropylidene palmitate, dodecyl palmitate, tetradodecyl palmitate, pentadodecyl palmitate, octadodecyl palmitate, cetyl palmitate, phenyl palmitate, phenacyl palmitate, cetyl stearate, and ethyl behenate, monoesters of ethylene glycol such as glycol monolaurate, glycol monopalmitate, and glycol monostearate, diesters of ethylene glycol such as glycol dilaurate, glycol dipalmitate, and glycol distearate, monoesters of glycerol such as glycerol monolaurate, glycerol monomyristate, glycerol monopalmitate, and glycerol monostearate, diesters of glycerol such as glycerol dilaurate, glycerol dimyristate, glycerol dipalmitate, and glycerol distearate, triesters of glycerol such as glycerol trilaurate, glycerol trimyristate, glycerol tripalmitate, glycerol tristearate, palmitodiolein, palmitodistearin, and oleodistearin, and the like may be included.

In the present invention, the nucleating agents may be used singly or in combination of two or more of them. Among them, inorganic nucleating agents such as talc, kaolin, and barium sulfate are preferred since they are inexpensive.

In the present invention, it is preferred that the nucleating agent is blended in a mass ratio of biodegradable resin (for example, poly lactic acid)/nucleating agent of 95/0.01 to 50/10, particularly preferably 95/0.1 to 50/5 in that practically sufficient mechanical strength of the molded article can be obtained by the crystallization thereof. If the blending ratio of the nucleating agent is less than 95/0.01, the crystallization of the molded article will be insufficient so that the obtained molded article cannot obtain practically sufficient heat resistance. Further, if the blending ratio of the nucleating agent exceeds 50/10, it is not preferable since such results in a decrease in mechanical strength of the molded article and in an increase in the cost of the molding material.

The molding materials used for the present invention may be blended, in addition to the above-mentioned poly lactic acid, the reinforcing fiber and the crystallization nucleating agent, with light-shielding fillers such as carbon black, slidability improving agents such as silicone oil, filler such as talc and mica, coloring agents such as pigments, antioxidants, antibacterial agents, antifungal agents, foaming agents, ultraviolet absorbers, fire retardants, antistats, plasticizers, etc., if necessary.

In the present invention, resin molded articles are produced by a method of heat molding a molding material composed of a mixture of a biodegradable resin, a reinforcing fiber, and other optionally blended ingredients. The heat molding may be performed by any one of injection molding, compression molding, extrusion molding, etc.

On this occasion, since the biodegradable resin having a high molecular weight does not have the tendency to crystallize, there is a fear that it will be difficult to crystallize it even by means of the following annealing treatment. Accordingly, it is effective to adjust the molecular weight of the biodegradable resin or to use a biodegradable resin having a low molecular weight, which is readily crystallized. In the case where out of the biodegradable resins whose molecular weight is decreased during a heat molding step, for example, poly lactic acid, those that are readily hydrolyzed upon contact with water in a molten state, are used, it is effective to control the amount of water in the molding material before the heat molding and it is important that the molding material is not excessively dried.

In the present invention, since the molded article obtained by heat molding the molding materials having biodegradable resin as a main component is generally in a non-crystalline state, the annealing treatment of the molded article to crystallize it can give rise to a resin molded article having improved heat resistance. The crystallization by annealing treatment can be efficiently achieved when a DSC curve prepared by measurement on the molded article shows a crystallization peak at the time of lowering the temperature and the temperature of the crystallization peak at the time of lowering the temperature is in a range of 120 to 80° C. If the peak temperature is outside this range or if the peak temperature is not observed, there is a fear that the molded article will not be sufficiently crystallized by annealing treatment, so that the desired properties such as heat resistance cannot be obtained. The measurement of the temperature-lowering crystallization by DSC can be performed by setting 20 mg of a sample in a DSC measurement cell, raising the temperature of the sample to the melting point in a temperature raising rate of 10° C./minute, maintaining that temperature for 1 minute, and then lowering the temperature at a rate of 10° C./minute, followed by measurement and preparing a DSC curve, and observing an exothermic peak due to crystallization.

In the present invention, the annealing treatment may be performed by holding the molded article in the mold used for molding as it is. However, it is preferred that the annealing treatment is performed by once taking the molded article out of the mold and subjecting it to heat treatment once again from the viewpoint of production efficiency. It is preferred that the annealing treatment is performed in a temperature range of from 80 to 165° C., particularly preferably in a temperature range of from 100 to 130° C. If the annealing temperature is lower than 80° C., the crystallization will take a long time and the production method will not be efficient. On the other hand, if the annealing temperature is higher than 165° C., it will be close to the melting point so that the crystallization becomes difficult. The annealing treatment is performed for 0.1 to 30 minutes, preferably 0.2 to 10 minutes and more preferably 0.5 to 5 minutes after the temperature of the molded article has reached the treating temperature. A longer annealing time is more preferred. However, use of a longer time results in a decrease in the production efficiency and stopping the annealing in a short time before completion of the crystallization results in a failure of obtaining the desired properties.

The annealing treatment can be performed either by a batch treatment or a continuous treatment. Heating means may be any one of a far infrared heater, a near infrared lamp, hot air, high frequency heating, etc. It is also possible to use a plurality of the means from among them in combination.

The annealing treatment may be performed in the atmospheric environment.

Furthermore, generally the crystalline polymer has a property such that the lower its molecular weight, the more readily it is crystallized, but according as the crystallization proceeds, its mechanical strength will be decreased. Use of poly lactic acid having a weight average molecular weight of less than 50,000 results in a decrease in the mechanical strength of the obtained resin molded article, which is not applicable to applications where some strength is required. In addition, when in contact with water in a molten state, poly lactic acid tends to be readily hydrolyzed, causing a decrease in molecular weight. Hence, supply of the molding material to a molding machine after sufficiently drying it so as to have a water content of about 50 ppm or less, will result in a less decrease in molecular weight. However, in this case a large scale drying equipment is required in order to attain a degree of drying such as a water content of about 50 ppm and the management of the dried molding material is also cumbersome. Accordingly, in the case where a resin molded article is produced by injection molding by using poly lactic acid as a biodegradable resin in the present invention, it is preferred that the water content of the molding material is controlled corresponding to the weight average molecular weight and the optical purity of the poly lactic acid used. This enables one to obtain a resin molded article that is one of the objectives of the present invention, without performing any annealing treatment. Controlling the water content of the molding material by using a general-purpose vacuum drier can prevent a decrease in molecular weight in the molding step to some extent. Injection molding poly lactic acid having a weight average molecular weight of 50,000 or more and less than 120,000 with controlling the water content of the molding material immediately before molding to less than 200 ppm can give rise to a resin molded article in which crystallization readily proceeds upon annealing treatment and which has practically sufficient mechanical strength. A molding material that contains poly lactic acid having a weight average molecular weight of 50,000 or more and less than 120,000 and a water content of 200 ppm or more is hydrolyzed in the heat molding step and its molecular weight is decreased. For this reason, the obtained molded article has low strength so that it cannot be applied to applications where some strength is required.

Furthermore, in the case where poly lactic acid having a large weight average molecular weight is used, injection molding can be performed by: controlling the water content of a molding material to 1,500 ppm which can be readily reached by using a general-purpose hot air drier or tray type vacuum drier; heat molding the molding material in expectation of some decrease in molecular weight in the molding step, or adding the crystallization nucleating agent with controlling the water content. This can give rise to a required resin molded article.

For example, in the case where molding material containing poly lactic acid having a weight average molecular weight of 120,000 or more less than 200,000 with adding the crystallization nucleating agent is used, controlling the water content immediately before its molding to 200 to 1,500 ppm, or less than 200 ppm if necessary and then injection molding. This can give rise to a required resin molded article. Further, in the case where a molding material containing poly lactic acid having a weight average molecular weight of 50,000 or more and less than 120,000 and L-lactic acid with optical purity of 88 or more, a reinforcing fiber and a crystallization nucleating agent is injection molded, it is preferred to control a water content of less than 200 ppm. In the case where molding material containing poly lactic acid having a weight average molecular weight of 120,000 or more and less than 200,000 and L-lactic acid with optical purity of 88% or more, a reinforcing fiber and a crystallization nucleating agent is injection molded, it is preferred to control a water content of 200 to 1,500 ppm. In the case where molding material containing poly lactic acid having a weight average molecular weight of 120,000 or more and less than 200,000 and L-lactic acid with optical purity of 95% or more and a reinforcing fiber is injection molded, it is preferred that the molding material is injection molded after a water content is controlled to 200 to 1,500 ppm, and then anneal treatment is performed to crystallize obtained molded article.

This can give rise to a resin molded article in which crystallization readily proceeds and which has practically sufficient mechanical strength. In this case, if the water content of the molding material exceeds 1,500 ppm, the hydrolysis of poly lactic acid in the molding step is vigorous so that the molecular weight of the poly lactic acid will become lower than is predetermined and the physical properties of the obtained resin molded article will be deteriorated so that there is a fear that a resin molded article having desired heat resistance, mechanical properties, etc. cannot be obtained.

In the present invention, from the viewpoint of capability of stable molding a molding material having blended therein reinforcing fiber, it is desirable that the injection molding is performed by using an injection molding mold having a resin flow outlet with a gate area of $7.8 \times 10^{-3}$ to 51 mm$^2$, particularly preferably 0.1 to 13 mm$^2$. The term "gate area" as used herein refers to an aperture sectional area of the connection portion between an article part and a runner part. For example, in the case of a cold runner type injection molding mold, it refers to an aperture sectional area at the gate part and in the case of a hot runner type injection molding mold with a valve gate structure, it refers to a difference between the sectional area of the aperture portion in the gate part in a state closed by the valve gate, i.e., gate aperture sectional area, $D_1$, and a sectional area at the distal end of a needle valve, $d_2$, i.e., $D_1-d_2$.

In the present invention, the resin molded article obtained by heat molding where the molding material is blended with a nucleating agent will be crystallized during standing to cool after molding due to the blended nucleating agent, so that a resin molded article having improved heat resistance can be obtained. Furthermore, in the case where the obtained resin molded article is in an amorphous state, crystallization of the molded article by the above-mentioned annealing treatment or the like can give rise to a resin molded article having improved heat resistance.

The degree of crystallization of the resin molded article is at a heat of fusion of crystal of preferably 20 mJ/mg or more, more preferably 30 mJ/mg or more in consideration that a resin molded article having desired heat resistance properties can be obtained, and particularly preferably 35 mJ/mg or more since the more crystal generation amount, the more improved the heat resistance. In the present invention, the heat of fusion of crystal of the resin molded article is a value obtained by measuring at a heat elevation rate of 10° C./minute by using a differential scanning calorimeter.

In the present invention, the resin molded article may be subjected to coating, plating and the like treatments after completion of the predetermined treatments including annealing treatment.

EXAMPLES

Hereinafter, the method of producing resin molded members of the present invention will be described in detail by examples. However, the present invention should not be considered as being limited to the examples.

Example 1

Pellets of poly lactic acid (Lacty 9020, trade name, manufactured by Shimadzu Corporation) were mixed with 0.1 mass % of carbon black (#950, trade name, manufactured by Mitsubishi Chemical Corporation) and 15 mass % of carbon fiber (BESFIGHT HTA-C6-S, trade name, manufactured by Toho Rayon Co., Ltd.). The obtained mixture was dried in a vacuum drier (120° C., 600 Pa) for 6 hours, kneaded at 230° C. by using a twin-screw kneader, extruded therefrom in a form of a strand, and water-cooled to form pellets. The obtained raw material pellets were dried for 4 hours in a hot air drier at 80° C. and then supplied to an injection molding machine to prepare a frame and a back lid of an instant film pack (a frame 3 and a back lid 5 of an instant film pack 1 shown in FIG. 1).

Samples each weighing 20 mg collected from the frame and the back lid, respectively, were set in a measurement cell of DSC and heated at a temperature elevation rate of 10° C./minute to the melting point, maintaining that temperature for 1 minute, and then lowering the temperature at a rate of 10° C./minute to measure a DSC curve, an exothermic peak due to crystallization at 94° C. was observed.

Then, the frame 3 and the back lid 5 were annealed for 5 minutes in a hot air drier at 120° C. Into the frame 3 and the back lid 5 thus obtained were incorporated an upper light-shielding sheet 7, an elastic plate 9, a flexible light-shielding sheet 13 and a film unit 15 shown in FIG. 1, which are conventionally used non-biodegradable members, to assemble an instant film pack (INSTAX mini). The instant film pack was mounted in an instant camera (CHEKIT, trade name, manufactured by Fuji Photo Film Co., Ltd.) and left to stand for 4 hours in a thermostatic oven at 70° C. and then cooled down to room temperature, followed by attempts of taking a picture therewith. No particular abnormality was observed.

Example 2

A frame and a back lid were injection molded under the same conditions as in Example 1 except that no annealing treatment was performed. The frame and the back lid were used as they were for assembling an instant film pack. The obtained instant film pack was mounted in an instant camera (CHEKIT, trade name, manufactured by Fuji Photo Film Co., Ltd.) and left to stand for 4 hours in a thermostatic oven at 70° C. and then cooled down to room temperature, followed by attempts of taking a picture. However, the upper light-shielding sheet could not be discharged and subsequent picture taking was impossible. Taking out the instant film pack out of the camera and checking it revealed that the film discharge outlet was deformed, thereby preventing the discharge of the upper light-shielding sheet.

Example 3

Example 1 was reproduced except that no carbon fiber was added. Upon measurement of the obtained molded article on its temperature-lowering by DSC, an exothermic peak due to crystallization at 93° C. was observed. Annealing the molded article for 5 minutes in a hot air drier heated at 120° C. resulted in deformation of both the frame and the back lid, so that they could not be assembled into an instant film pack.

Example 4

A frame and a back lid were prepared in the same manner as in Example 1 except that the annealing treatment was performed at a temperature of 75° C. The frame and the back lid thus obtained were used for assembling an instant film pack. The obtained instant film pack was mounted in an instant camera (CHEKIT, trade name, manufactured by Fuji Photo Film Co., Ltd.) and left to stand for 4 hours in a thermostatic oven at 70° C. and then cooled down to room temperature, followed by attempts of taking a picture. However, the upper light-shielding sheet could not be discharged and subsequent picture taking was impossible. Then, taking out the instant film pack out of the camera and checking it revealed that the film discharge outlet was deformed, thereby preventing the discharge of the upper light-shielding sheet.

Example 5

Pellets of poly lactic acid (Lacty 9020, trade name, manufactured by Shimadzu Corporation) were mixed with 0.1 mass % of carbon black (#950, trade name, manufactured by Mitsubishi Chemical Corporation) and 15 mass % of glass fiber (CHOPPED STRAND CS6PE-403, trade name, manufactured by Nitto Boseki Co., Ltd.). The obtained mixture was dried in a vacuum drier (120° C., 600 Pa) for 6 hours, kneaded at 230° C. by using a twin-screw kneader, extruded therefrom in a form of a strand, and water-cooled to form pellets. The obtained raw material pellets were dried for 4 hours in a hot air drier at 80° C. and then supplied to an injection molding machine to prepare a frame and a back lid of an instant film pack.

Upon measurement of the temperature-lowering in each of the frame and the back lid to prepare a DSC curve in the same manner as in Example 1, an exothermic peak due to crystallization at 94° C. was observed.

Then, the frame and the back lid were subjected to annealing treatment for 5 minutes in a hot air drier heated at 120° C. Into the frame and the back lid thus obtained were incorporated an upper light-shielding sheet, an elastic plate, a flexible light-shielding sheet, a bottom light-shielding sheet and a film unit, i.e., conventionally used non-biodegradable members, to assemble an instant film pack (INSTAX mini). The instant film pack was mounted in an instant camera (CHEKIT, trade name, manufactured by Fuji Photo Film Co., Ltd.), left to stand for 4 hours in a thermostatic oven at 70° C., and then cooled down to room temperature, followed by attempts of taking a picture therewith. No particular abnormality was observed.

Example 6

Pellets of poly lactic acid (Lacty 9020, trade name, manufactured by Shimadzu Corporation) were mixed with 0.1 mass % of carbon black (#950, trade name, manufactured by Mitsubishi Chemical Corporation) and 15 mass % of glass fiber (CHOPPED STRAND CS6PE-403, trade name, manufactured by Nitto Boseki Co., Ltd.). The obtained mixture was dried in a vacuum drier (120° C., 600 Pa) for 10 hours, kneaded at 230° C. by using a twin-screw kneader, extruded therefrom in a form of a strand, and water-cooled to form pellets. The obtained raw material pellets were dried for 10 hours in a vacuum drier (120° C., 600 Pa) and then supplied to an injection molding machine to which a hopper drier is provided to prepare a frame and a back lid of an instant film pack.

Upon measurement of the temperature-lowering in the frame and the back lid to prepare a DSC curve in the same manner as in Example 1, no exothermic peak due to crystallization was observed.

Then, the frame and the back lid were subjected to an annealing treatment for 15 minutes in a hot air drier heated at 120° C. Into the frame and the back lid thus obtained were incorporated an upper light-shielding sheet, an elastic plate, a flexible light-shielding sheet, a bottom light-shielding sheet, and a film unit, i.e., conventionally used non-biodegradable members, to assemble an instant film pack (INSTAX mini). The instant film pack was mounted in an instant camera (CHEKIT, trade name, manufactured by Fuji Photo Film Co., Ltd.) and left to stand for 4 hours in a thermostatic oven at 70° C. and then cooled down to room temperature, followed by attempts of taking a picture. However, the upper light-shielding sheet could not be discharged and subsequent picture taking was impossible. Then, taking out the instant film pack out of the camera and checking it revealed that the film discharge outlet was deformed, thereby preventing the discharge of the upper light-shielding sheet.

Example 7

A mixture of 85 mass parts of pellets of poly lactic acid having an lactic acid with optical purity of 98%, 0.1 mass part of carbon black, and 15 mass parts of glass fiber was kneaded by using a twin-screw kneader to form pellets. The pellets were dried in a vacuum drier at 120° C. for 2.5 hours under reduced pressure. Then, measurement of the pellets showed a weight average molecular weight of poly lactic acid therein of 115,000 and a water content of 150 ppm.

The pellets were fed to an injection molding machine to produce a frame 3 and a back lid 5 of an instant film pack 1 as shown in FIG. 1. The frame and the back lid were subjected to annealing treatment in a hot air drier heated at 120° C. for 5 minutes.

Samples each weighing 20 mg collected from the frame 3 and the back lid 5, respectively, were set in a measurement cell of DSC and heated at a temperature elevation rate of 10° C./minute to measure a DSC curve, from which a heat of fusion of crystal of 39 mJ/mg was obtained.

Then, to the frame 3 and the back lid 5 were incorporated conventionally used non-biodegradable members, i.e., an upper light-shielding sheet 7, an elastic plate 9, a flexible light-shielding sheet 13, and a film unit 15 as shown in FIG. 1 to assemble an instant film pack (INSTAX mini). The instant film pack was mounted in an instant camera (Checkit, manufactured by Fuji Photo Film Co., Ltd.), left to stand in a thermostat at 70° C. for 4 hours, and then cooled to room temperature. When picture taking by this instant camera was tried, no abnormality was observed, and the picture taking could be performed smoothly.

Example 8

A mixture of 92 mass parts of pellets of poly lactic acid having an lactic acid with optical purity of 98%, 0.1 mass part of carbon black, and 8 mass parts of carbon fiber was kneaded by using a twin-screw kneader to form pellets. The pellets were dried in a vacuum drier at 100° C. for 2 hours under reduced pressure. Then, measurement of the pellets showed a weight average molecular weight of poly lactic acid therein of 110,000 and a water content of 170 ppm.

The pellets were fed to an injection molding machine to produce a frame 3 and a back lid 5 of an instant film pack 1 as shown in FIG. 1. The frame and the back lid were subjected to annealing treatment in a hot air drier heated at 120° C. for 10 minutes.

Measurement of the frame and back lid by DSC in the same manner as in Example 7 showed a heat of fusion of crystal of 40 mJ/mg. Furthermore, by using the frame and the back lid, an instant film pack was assembled and picture taking by an instant camera in the same manner as in Example 7 was tried, which showed no abnormality and the picture taking could be performed smoothly.

Example 9

A mixture of 95 mass parts of pellets of poly lactic acid having an L-lactic acid with optical purity of 98%, 0.1 mass part of carbon black, and 5 mass parts of carbon fiber were kneaded by using a twin-screw kneader to form pellets. The pellets were dried in a vacuum drier at 100° C. for 2 hours under reduced pressure. Then, measurement of the pellets showed a weight average molecular weight of poly lactic acid therein of 118,000 and a water content of 180 ppm.

The pellets were fed to an injection molding machine to produce a frame 3 and a back lid 5 of an instant film pack 1 as shown in FIG. 1. The frame and the back lid were subjected to annealing treatment in a hot air drier heated at 120° C. for 10 minutes.

Measurement of the frame and back lid by DSC in the same manner as in Example 7 showed a heat of fusion of crystal of 40 mJ/mg. Furthermore, by using the frame and the back lid, an instant film pack was assembled and picture taking by an instant camera in the same manner as in Example 7 was tried, which showed no particular abnormality and the picture taking could be performed smoothly.

Example 10

A mixture of 70 mass parts of pellets of poly lactic acid having an L-lactic acid with optical purity of 95%, 0.1 mass part of carbon black, and 30 mass parts of glass fiber was kneaded by using a twin-screw kneader to form pellets. The pellets were dried in a vacuum drier at 100° C. for 2.5 hours under reduced pressure. Then, measurement of the pellets showed a weight average molecular weight of poly lactic acid therein of 94,000 and a water content of 150 ppm.

The pellets were fed to an injection molding machine to produce a frame 3 and a back lid 5 of an instant film pack as shown in FIG. 1. The frame and the back lid were subjected to annealing treatment in a hot air drier heated at 120° C. for 5 minutes.

Measurement of the frame and back lid by DSC in the same manner as in Example 7 showed a heat of fusion of crystal of 30 mJ/mg. Furthermore, by using the frame and the back lid, an instant film pack was assembled and picture taking by an instant camera in the same manner as in Example 1 was tried, which showed no particular abnormality and the picture taking could be performed smoothly.

Example 11

A mixture of 92 mass parts of pellets of poly lactic acid having an L-lactic acid with optical purity of 93%, 0.1 mass part of carbon black, and 8 mass parts of carbon fiber was kneaded by using a twin-screw kneader to form pellets. The pellets were dried in a vacuum drier at 100° C. for 3 hours under reduced pressure. Then, measurement of the pellets showed a weight average molecular weight of poly lactic acid therein of 101,000 and a water content of 130 ppm.

The pellets were fed to an injection molding machine to produce a frame 3 and a back lid 5 of an instant film pack 1 as shown in FIG. 1. The frame and the back lid were subjected to annealing treatment in a hot air drier heated at 120° C. for 5 minutes.

Measurement of the frame and back lid by DSC on heat of fusion of crystal was tried in the same manner as in Example 7 but the measurement could not be made and the crystals generated by annealing were under measurement limit. Furthermore, an instant film pack was assembled by using the frame and the back lid and picture taking by an instant camera was tried in the same manner as in Example 7. However, the upper light-shielding sheet could not be discharged so that subsequent picture taking was impossible.

Example 12

A mixture of 97 mass parts of pellets of poly lactic acid having an L-lactic acid with optical purity of 93%, 0.1 mass part of carbon black, and 3 mass parts of glass fiber was kneaded by using a twin-screw kneader to form pellets. The pellets were dried in a vacuum drier at 100° C. for 3 hours under reduced pressure. Then, measurement of the pellets showed a weight average molecular weight of poly lactic acid therein of 102,000 and a water content of 130 ppm.

The pellets were fed to an injection molding machine to produce a frame 3 and a back lid 5 of an instant film pack 1 as shown in FIG. 1. The frame and the back lid were subjected to annealing treatment in a hot air drier heated at 120° C. for 10 minutes.

Measurement of the frame and back lid by DSC on heat of fusion of crystal was tried in the same manner as in Example 7 but the measurement could not be made and the crystals generated by annealing were under the measurement limit. Furthermore, an instant film pack was assembled by using the frame and the back lid and picture taking by an instant camera was tried in the same manner as in Example 7. However, the upper light-shielding sheet could not be discharged so that subsequent picture taking was impossible.

Example 13

A mixture of 85 mass parts of pellets of poly lactic acid having an L-lactic acid with optical purity of 98%, 0.1 mass part of carbon black, and 15 mass parts of glass fiber was kneaded by using a twin-screw kneader to form pellets. The pellets were dried in a vacuum drier at 100° C. for 2 hours under reduced pressure. Then, measurement of the pellets showed a weight average molecular weight of poly lactic acid therein of 46,000 and a water content of 190 ppm.

The pellets were fed to an injection molding machine to produce a frame 3 and a back lid 5 of an instant film pack 1 as shown in FIG. 1. The frame and back lid were subjected to annealing treatment in a hot air drier heated at 120° C. for 5 minutes. However, deformation during the annealing was considerable so that no instant film pack could be assembled.

Furthermore, measurement of the frame and back lid by DSC in the same manner as in Example 7 showed a heat of fusion of crystal of 41 mJ/mg.

Example 14

A mixture of 85 mass parts of pellets of poly lactic acid having an L-lactic acid eighth optical purity of 98%, 0.1 mass part of carbon black, and 15 mass parts of glass fiber was not dried but just kneaded as it is by using a twin-screw kneader to form pellets. The pellets were dried in a vacuum drier at 100° C. for an hour under reduced pressure. Then, measurement of the pellets showed a weight average molecular weight of poly lactic acid therein of 52,000 and a water content of 220 ppm.

The pellets were fed to an injection molding machine to produce a frame 3 and a back lid 5 of an instant film pack 1 as shown in FIG. 1. The frame and the back lid were subjected to annealing treatment in a hot air drier heated at 120° C. for 5 minutes.

Measurement of the frame and back lid by DSC in the same manner as in Example 7 showed a heat of fusion of crystal of 40 mJ/mg. Furthermore, by using the frame and the back lid, assembling of an instant film pack was tried. However, the frame and the back lid were brittle and broke when force was applied, so that no instant film pack could be assembled.

TABLE 1

| | Poly lactic acid | | Reinforcing fiber | | Drying | | | Heat of fusion | |
|---|---|---|---|---|---|---|---|---|---|
| | optical purity of L-lactic acid purity (%) | Weight average molecular weight | Kind | Blending ratio (mass %) | condition before molding | Water content (ppm) | Annealing treatment | of crystal (mJ/mg) | Result |
| Example 7 | 98 | 115000 | Glass fiber | 15 | Vacuum drier 100° C. × 2.5 hr | 150 | 120° C. × 5 minutes | 39 | OK |
| Example 8 | 98 | 110000 | Carbon fiber | 8 | Vacuum drier 100° C. × 2 hr | 170 | 120° C. × 10 minutes | 40 | OK |
| Example 9 | 98 | 118000 | Carbon fiber | 5 | Vacuum drier 100° C. × 2 hr | 180 | 120° C. × 10 minutes | 40 | OK |
| Example 10 | 95 | 94000 | Glass fiber | 30 | Vacuum drier 100° C. × 2.5 hr | 150 | 120° C. × 5 minutes | 30 | OK |
| Example 11 | 93 | 101000 | Carbon fiber | 8 | Vacuum drier 100° C. × 3 hr | 130 | 120° C. × 5 minutes | — | NG |
| Example 12 | 93 | 102000 | Glass fiber | 3 | Vacuum drier 100° C. × 3 hr | 130 | 120° C. × 10 minutes | — | Impossible to perform the discharge test due to deformation during annealing |
| Example 13 | 98 | 46000 | Glass fiber | 15 | Vacuum drier 100° C. × 2 hr | 190 | 120° C. × 5 minutes | 41 | Impossible to perform the discharge test, and brittle |
| Example 14 | 98 | 52000 | Glass fiber | 15 | Vacuum drier 100° C. × 1 hr | 220 | 120° C. × 5 minutes | 40 | Impossible to perform the discharge test, and brittle |

Example 15

A mixture of 75 mass parts of pellets of poly lactic acid having an L-lactic acid with optical purity of 98%, 0.1 mass part of carbon black, 15 mass parts of glass fiber as well as 10 mass part of talc as a nucleating agent was kneaded by using a twin-screw kneader to form pellets. The pellets were dried in a vacuum drier at 100° C. for 2.5 hours under reduced pressure. Then, measurement of the pellets showed a weight average molecular weight of poly lactic acid therein of 115,000 and a water content of 150 ppm.

The pellets were fed to an injection molding machine to produce a frame 3 and a back lid 5 of an instant film pack 1 as shown in FIG. 1.

Samples each weighing 20 mg collected from the frame 3 and the back lid 5, respectively, were set in a measurement cell of DSC and heated at a temperature elevation rate of 10° C./minute to measure a DSC curve, from which a heat of fusion of crystal of 41 mJ/mg was obtained.

Then, to the frame 3 and the back lid 5 were incorporated conventionally used non-biodegradable members, i.e., an upper light-shielding sheet 7, an elastic plate 9, a flexible light-shielding sheet 13, and a film unit 15 as shown in FIG. 1 to assemble an instant film pack (INSTAX mini). The instant film pack was mounted in an instant camera (Check-it, manufactured by Fuji Photo Film Co., Ltd.), left to stand in a thermostat at 70° C. for 4 hours, and then cooled to room temperature. When picture taking by this instant camera was tried, no particular abnormality was observed, and the picture taking could be performed smoothly.

Example 16

A mixture of 91 mass parts of pellets of poly lactic acid having an L-lactic acid with optical purity of 98%, 0.1 mass part of carbon black, 8 mass parts of carbon fiber as well as 1 mass part of barium sulfate as a nucleating agent was kneaded by using a twin-screw kneader to form pellets. The pellets were dried in a vacuum drier at 100° C. for 2 hours under reduced pressure. Then, measurement of the pellets showed a weight average molecular weight of poly lactic acid therein of 110,000 and a water content of 170 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 36 mJ/mg. Furthermore, by using the frame and the back lid, an instant film pack was assembled and picture taking by an instant camera in the same manner as in Example 1 was tried, which showed no particular abnormality and the picture taking could be performed smoothly.

Example 17

A mixture of 94.99 mass parts of pellets of poly lactic acid having an L-lactic acid with optical purity of 98%, 0.1 mass part of carbon black, 5 mass parts of carbon fiber as well as 0.01 mass part of talc as a nucleating agent was kneaded by using a twin-screw kneader to form pellets. The pellets were dried in a vacuum drier at 100° C. for 2 hours under reduced pressure. Then, measurement of the pellets showed a weight average molecular weight of poly lactic acid therein of 118,000 and a water content of 180 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 25 mJ/mg. Furthermore, by using the frame and the back lid, an instant film pack was assembled and picture taking by an instant camera in the same manner as in Example 15 was tried, which showed no particular abnormality and the picture taking could be performed smoothly.

Example 18

A mixture of 60 mass parts of pellets of poly lactic acid having an L-lactic acid with optical purity of 95%, 0.1 mass part of carbon black, 30 mass parts of glass fiber as well as 10 mass part of talc as a nucleating agent was kneaded by using a twin-screw kneader to form pellets. The pellets were dried in a vacuum drier at 100° C. for 2.5 hours under reduced pressure. Then, measurement of the pellets showed a weight average molecular weight of poly lactic acid therein of 52,000 and a water content of 150 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 43 mJ/mg. Furthermore, by using the frame and the back lid, an instant film pack was assembled and picture taking by an instant camera in the same manner as in Example 15 was tried, which showed no particular abnormality and the picture taking could be performed smoothly.

Example 19

A mixture of 91.995 mass parts of pellets of poly lactic acid having an L-lactic acid with optical purity of 86%, 0.1 mass part of carbon black, 8 mass parts of carbon fiber as well as 0.005 mass part of talc as a nucleating agent was kneaded by using a twin-screw kneader to form pellets. The pellets were dried in a vacuum drier at 100° C. for 3 hours under reduced pressure. Then, measurement of the pellets showed a weight average molecular weight of poly lactic acid therein of 101,000 and a water content of 130 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 10 mJ/mg.

Furthermore, an instant film pack was assembled by using the frame and the back lid and picture taking by an instant camera was tried in the same manner as in Example 15. However, the upper light-shielding sheet could not be discharged so that subsequent picture taking was impossible.

Example 20

A mixture of 96 mass parts of pellets of poly lactic acid having an L-lactic acid with optical purity of 98%, 0.1 mass part of carbon black, 3 mass parts of glass fiber as well as 1 mass part of barium sulfate as a nucleating agent was kneaded by using a twin-screw kneader to form pellets. The pellets were dried in a vacuum drier at 100° C. for 3 hours under reduced pressure. Then, measurement of the pellets showed a weight average molecular weight of poly lactic acid therein of 46,000 and a water content of 130 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 38 mJ/mg. Furthermore, by using the frame and the back lid, an instant film pack assembling was tried. However, the frame and the back lid were brittle and broken when force was applied, so that no instant film pack could be assembled.

Example 21

A mixture of 80 mass parts of pellets of poly lactic acid having an L-lactic acid with optical purity of 86%, 0.1 mass part of carbon black, 15 mass parts of glass fiber as well as 5 mass parts of talc as a nucleating agent was kneaded by using a twin-screw kneader to form pellets. The pellets were dried in a vacuum drier at 100° C. for 2 hours under reduced pressure. Then, measurement of the pellets showed a weight average molecular weight of poly lactic acid therein of 52,000 and a water content of 190 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 12 mJ/mg.

Furthermore, an instant film pack was assembled by using the frame and the back lid and picture taking by an instant camera was tried in the same manner as in Example 15. However, the upper light-shielding sheet could not be discharged so that subsequent picture taking was impossible.

Example 22

A mixture of 80 mass parts of pellets of poly lactic acid having an L-lactic acid with optical purity of 95%, 0.1 mass part of carbon black, 15 mass parts of glass fiber as well as 5 mass parts of barium sulfate as a nucleating agent was kneaded by using a twin-screw kneader to form pellets. The pellets were dried in a vacuum drier at 100° C. for 1 hour under reduced pressure. Then, measurement of the pellets showed a weight average molecular weight of poly lactic acid therein of 52,000 and a water content of 220 ppm.

The pellets were fed to an injection molding machine to produce a frame 3 and a back lid 5 of an instant film pack 1 as shown in FIG. 1.

Measurement of the frame and back lid by DSC in the same manner as in Example 15 showed a heat of fusion of crystal of 41 mJ/mg. Furthermore, by using the frame and the back lid, an instant film pack assembling was tried. However, the frame and the back lid were brittle and broken when force was applied, so that no instant film pack could be assembled.

TABLE 2

| | Poly lactic acid | | Reinforcing fiber | | Nucleating agent | | Drying conditions before molding | | Water content | Heat of fusion of crystal | |
|---|---|---|---|---|---|---|---|---|---|---|---|
| | optical purity | Weight average molecular weight | Kind | Blending ratio | Kind | Blending ratio | Drier | Condition | | | Result |
| | (%) | | | (mass %) | | (mass %) | | | (ppm) | (mJ/mg) | |
| Example 15 | 98 | 115000 | Glass fiber | 15 | Talc | 10 | Vacuum | 100° C. × 2.5 Hr | 150 | 41 | OK |
| Example 16 | 98 | 110000 | Carbon fiber | 8 | Barium sulfate | 1 | Vacuum | 100° C. × 2 Hr | 170 | 36 | OK |
| Example 17 | 98 | 118000 | Carbon fiber | 5 | Talc | 0.01 | Vacuum | 100° C. × 2 Hr | 180 | 25 | OK |
| Example 18 | 95 | 52000 | Glass fiber | 30 | Talc | 10 | Vacuum | 100° C. × 2.5 Hr | 150 | 43 | OK |
| Example 19 | 86 | 101000 | Carbon fiber | 8 | Talc | 0.005 | Vacuum | 100° C. × 3 Hr | 130 | 10 | Impossible to discharge |
| Example 20 | 98 | 46000 | Glass fiber | 3 | Barium sulfate | 1 | Vacuum | 100° C. × 3 Hr | 130 | 38 | Brittle |
| Example 21 | 86 | 52000 | Glass fiber | 15 | Talc | 5 | Vacuum | 100° C. × 2 Hr | 190 | 12 | Impossible to discharge |
| Example 22 | 95 | 52000 | Glass fiber | 15 | Barium sulfate | 5 | Vacuum | 100 × 1 Hr | 220 | 41 | Brittle |

Example 23

A mixture of 75 mass parts of pellets of poly lactic acid having an L-lactic acid with optical purity of 98%, 0.1 mass part of carbon black, and 15 mass parts of glass fiber as well as 10 mass parts of talc as a nucleating agent was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 130,000 and a water content of 450 ppm.

The pellets were fed to an injection molding machine to produce a frame 3 and a back lid 5 of an instant film pack 1 as shown in FIG. 1.

Samples each weighing 20 mg collected from the frame 3 and the back lid 5, respectively, were set in a measurement cell of DSC and heated at a temperature elevation rate of 10° C./minute to measure a DSC curve, from which a heat of fusion of crystal of 40 mJ/mg was obtained.

Then, to the frame 3 and the back lid 5 were incorporated conventionally used non-biodegradable members, i.e., an upper light-shielding sheet 7, an elastic plate 9, a flexible light-shielding sheet 13, and a film unit 15 as shown in FIG. 1 to assemble an instant film pack (INSTAX mini). The instant film pack was mounted in an instant camera (Check-it, manufactured by Fuji Photo Film Co., Ltd.), left to stand in a thermostat at 70° C. for 4 hours, and then cooled to room temperature. When picture taking by this instant camera was tried, no particular abnormality was observed, and the picture taking could be performed smoothly.

Example 24

A mixture of 89 mass parts of pellets of poly lactic acid having an L-lactic acid with optical purity of 98%, 0.1 mass part of carbon black, and 10 mass parts of carbon fiber as well as 1 mass part of Barium sulfate as a nucleating agent was dried in a hot air drier at 80° C. for 6 hours and then kneaded by using a twin-screw kneader to form pellets. The pellets were again dried in a hot air drier at 80° C. for 3 hours. Then, measurement of the pellets showed a weight average molecular weight of poly lactic acid therein of 135,000 and a water content of 600 ppm.

The pellets were fed to an injection molding machine to produce a frame 3 and a back lid 5 of an instant film pack 1 as shown in FIG. 1.

Measurement of the frame and back lid by DSC in the same manner as in Example 23 showed a heat of fusion of crystal of 35 mJ/mg. Furthermore, by using the frame and the back lid, an instant film pack was assembled and picture taking by an instant camera in the same manner as in Example 23 was tried, which showed no particular abnormality and the picture taking could be performed smoothly.

Example 25

A mixture of 94.99 mass parts of pellets of poly lactic acid having an L-lactic acid with optical purity of 98%, 0.1 mass part of carbon black, and 5 mass parts of carbon fiber as well as 0.01 mass part of talc as a nucleating agent was dried in a hot air drier at 80° C. for 6 hours and then kneaded by using a twin-screw kneader to form pellets. The pellets were again dried in a hot air drier at 50° C. for 2 hours. Then, measurement of the pellets showed a weight average molecular weight of poly lactic acid therein of 160,000 and a water content of 1,100 ppm.

The pellets were fed to an injection molding machine to produce a frame 3 and a back lid 5 of an instant film pack 1 as shown in FIG. 1.

Measurement of the frame and back lid by DSC in the same manner as in Example 23 showed a heat of fusion of crystal of 20 mJ/mg. Furthermore, by using the frame and the back lid, an instant film pack was assembled and picture taking by an instant camera in the same manner as in Example 23 was tried, which showed no abnormality and the picture taking could be performed smoothly.

Example 26

A mixture of 70 mass parts of pellets of poly lactic acid having an L-lactic acid with optical purity of 95%, 0.1 mass part of carbon black, and 20 mass parts of glass fiber as well as 10 mass parts of talc as a nucleating agent was dried in a hot air drier at 80° C. for 6 hours and then kneaded by using a twin-screw kneader to form pellets. The pellets were again dried in a hot air drier at 80° C. for 8 hours. Then, measurement of the pellets showed a weight average molecular weight of poly lactic acid therein of 125,000 and a water content of 400 ppm.

The pellets were fed to an injection molding machine to produce a frame 3 and a back lid 5 of an instant film pack as shown in FIG. 1.

Measurement of the frame and back lid by DSC in the same manner as in Example 23 showed a heat of fusion of crystal of 32 mJ/mg. Furthermore, by using the frame and the back lid, an instant film pack was assembled and picture taking by an instant camera in the same manner as in Example 23 was tried, which showed no abnormality and the picture taking could be performed smoothly.

Example 27

A mixture of 89.995 mass parts of pellets of poly lactic acid having an L-lactic acid with optical purity of 86%, 0.1 mass part of carbon black, and 10 mass parts of carbon fiber as well as 0.005 mass part of talc as a nucleating agent was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 133,000 and a water content of 420 ppm.

The pellets were fed to an injection molding machine to produce a frame 3 and a back lid 5 of an instant film pack 1 as shown in FIG. 1.

Measurement of the frame and back lid by DSC in the same manner as in Example 23 showed a heat of fusion of crystal of 14 mJ/mg. Furthermore, an instant film pack was assembled by using the frame and the back lid and picture taking by an instant camera was tried in the same manner as in Example 23. However, the upper light-shielding sheet could not be discharged so that subsequent picture taking was impossible.

Example 28

A mixture of 97.995 mass parts of pellets of poly lactic acid having an L-lactic acid with optical purity of 86%, 0.1 mass part of carbon black, and 2 mass parts of carbon fiber as well as 0.005 mass part of Barium sulfate as a nucleating agent was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 128,000 and a water content of 400 ppm.

The pellets were fed to an injection molding machine to produce a frame 3 and a back lid 5 of an instant film pack 1 as shown in FIG. 1.

Measurement of the frame and back lid by DSC in the same manner as in Example 23 showed a heat of fusion of crystal of 11 mJ/mg. Furthermore, an instant film pack was assembled by using the frame and the back lid and picture taking by an instant camera was tried in the same manner as in Example 23. However, the upper light-shielding sheet could not be discharged so that subsequent picture taking was impossible.

Example 29

A mixture of 80 mass parts of pellets of poly lactic acid having an L-lactic acid with optical purity of 98%, 0.1 mass part of carbon black, and 15 mass parts of glass fiber as well as 5 mass parts of talc as a nucleating agent was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 87,000 and a water content of 450 ppm.

The pellets were fed to an injection molding machine to produce a frame 3 and a back lid 5 of an instant film pack 1 as shown in FIG. 1.

Measurement of the frame and back lid by DSC in the same manner as in Example 23 showed a heat of fusion of crystal of 39 mJ/mg. Furthermore, by using the frame and the back lid, an instant film pack assembling was tried. However, the frame and the back lid were brittle and broken when force was applied, so that no instant film pack could be assembled.

Example 30

A mixture of 80 mass parts of pellets of poly lactic acid having an L-lactic acid with optical purity of 98%, 0.1 mass part of carbon black, and 15 mass parts of glass fiber as well as 5 mass parts of Barium sulfate as a nucleating agent was not dried and then kneaded by using a twin-screw kneader to form pellets. Measurement of the pellets showed a weight average molecular weight of poly lactic acid therein of 128,000 and a water content of 1,600 ppm.

The pellets were fed to an injection molding machine to produce a frame 3 and a back lid 5 of an instant film pack 1 as shown in FIG. 1.

Measurement of the frame and back lid by DSC in the same manner as in Example 23 showed a heat of fusion of crystal of 40 mJ/mg. Furthermore, by using the frame and the back lid, an instant film pack assembling was tried. However, the frame and the back lid were brittle and broken when force was applied, so that no instant film pack could be assembled.

TABLE 3

| | Poly lactic acid | | Reinforcing fiber | | Nucleating agent | | Drying conditions before molding | | Water content | Heat of fusion of crystal | |
|---|---|---|---|---|---|---|---|---|---|---|---|
| | optical purity (%) | weight average molecular weight | Kind | Blending ratio (mass %) | Kind | Blending ratio (mass %) | Drier | Condition | (ppm) | (mj/mg) | Result |
| Example 23 | 98 | 130000 | Glass fiber | 15 | Talc | 10 | Hot air | 80° C. × 6 Hr | 450 | 40 | OK |

TABLE 3-continued

| | Poly lactic acid | | Reinforcing fiber | | Nucleating agent | | Drying conditions before molding | | Water content | Heat of fusion of crystal | |
|---|---|---|---|---|---|---|---|---|---|---|---|
| | optical purity | Weight average molecular | | Blending ratio | | Blending ratio | | | | | |
| | (%) | weight | Kind | (mass %) | Kind | (mass %) | Drier | Condition | (ppm) | (mj/mg) | Result |
| Example 24 | 98 | 135000 | Carbon fiber | 10 | Barium sulfate | 1 | Hot air | 80° C. × 3 Hr | 600 | 35 | OK |
| Example 25 | 98 | 160000 | Carbon fiber | 5 | Talc | 0.01 | Hot air | 50° C. × 2 Hr | 1100 | 20 | OK |
| Example 26 | 95 | 125000 | Glass fiber | 20 | Talc | 10 | Hot air | 80° C. × 8 Hr | 400 | 32 | OK |
| Example 27 | 86 | 133000 | Carbon fiber | 10 | Talc | 0.005 | Hot air | 80° C. × 6 Hr | 420 | 14 | Impossible to discharge |
| Example 28 | 86 | 128000 | Carbon fiber | 2 | Barium sulfate | 0.005 | Hot air | 80° C. × 6 Hr | 400 | 11 | Impossible to discharge |
| Example 29 | 98 | 87000 | Glass fiber | 15 | Talc | 5 | Hot air | 80° C. × 6 Hr | 450 | 39 | Brittle |
| Example 30 | 98 | 128000 | Glass fiber | 15 | Barium sulfate | 5 | — | — | 1600 | 40 | Brittle |

Example 31

A mixture of 85 mass parts of pellets of poly lactic acid having an L-lactic acid with optical purity of 98%, 0.1 mass part of carbon black, and 15 mass parts of glass fiber was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 130,000 and a water content of 450 ppm.

The pellets were fed to an injection molding machine to produce a frame 3 and a back lid 5 of an instant film pack 1 as shown in FIG. 1. The frame and the back lid were annealed for 5 minutes in a hot air drier at 120° C.

Samples each weighing 20 mg collected from the frame 3 and the back lid 5, respectively, were set in a measurement cell of DSC and heated at a temperature elevation rate of 10° C./minute to measure a DSC curve, from which a heat of fusion of crystal of 38 mJ/mg was obtained.

Then, to the frame 3 and the back lid 5 were incorporated conventionally used non-biodegradable members, i.e., an upper light-shielding sheet 7, an elastic plate 9, a flexible light-shielding sheet 13, and a film unit 15 as shown in FIG. 1 to assemble an instant film pack (INSTAX mini). The instant film pack was mounted in an instant camera (Check-it, manufactured by Fuji Photo Film Co., Ltd.), left to stand in a thermostat at 70° C. for 4 hours, and then cooled to room temperature. When picture taking by this instant camera was tried, no particular abnormality was observed, and the picture taking could be performed smoothly.

Example 32

A mixture of 90 mass parts of pellets of poly lactic acid having an L-lactic acid with optical purity of 98%, 0.1 mass part of carbon black, and 10 mass parts of carbon fiber was dried in a hot air drier at 80° C. for 6 hours and then kneaded by using a twin-screw kneader to form pellets. The pellets were again dried in a hot air drier at 80° C. for 3 hours. Then, measurement of the pellets showed a weight average molecular weight of poly lactic acid therein of 135,000 and a water content of 600 ppm.

The pellets were fed to an injection molding machine to produce a frame 3 and a back lid 5 of an instant film pack 1 as shown in FIG. 1. The frame and the back lid were annealed for 10 minutes in a hot air drier at 120° C.

Measurement of the frame and back lid by DSC in the same manner as in Example 31 showed a heat of fusion of crystal of 40 mJ/mg. Furthermore, by using the frame and the back lid, an instant film pack was assembled and picture taking by an instant camera in the same manner as in Example 31 was tried, which showed no particular abnormality and the picture taking could be performed smoothly.

Example 33

A mixture of 95 mass parts of pellets of poly lactic acid having an L-lactic acid with optical purity of 98%, 0.1 mass part of carbon black, and 5 mass parts of carbon fiber was dried in a hot air drier at 80° C. for 6 hours and then kneaded by using a twin-screw kneader to form pellets. The pellets were again dried in a hot air drier at 50° C. for 2 hours. Then, measurement of the pellets showed a weight average molecular weight of poly lactic acid therein of 160,000 and a water content of 1,100 ppm.

The pellets were fed to an injection molding machine to produce a frame 3 and a back lid 5 of an instant film pack 1 as shown in FIG. 1. The frame and the back lid were annealed for 5 minutes in a hot air drier at 120° C.

Measurement of the frame and back lid by DSC in the same manner as in Example 31 showed a heat of fusion of crystal of 35 mJ/mg. Furthermore, by using the frame and the back lid, an instant film pack was assembled and picture taking by an instant camera in the same manner as in Example 31 was tried, which showed no abnormality and the picture taking could be performed smoothly.

Example 34

A mixture of 80 mass parts of pellets of poly lactic acid having an L-lactic acid with optical purity of 95%, 0.1 mass part of carbon black, and 20 mass parts of glass was dried in a hot air drier at 80° C. for 6 hours and then kneaded by using a twin-screw kneader to form pellets. The pellets were again dried in a hot air drier at 80° C. for 8 hours. Then, measurement of the pellets showed a weight average molecular weight of poly lactic acid therein of 125,000 and a water content of 400 ppm.

The pellets were fed to an injection molding machine to produce a frame 3 and a back lid 5 of an instant film pack as shown in FIG. 1. The frame and the back lid were annealed for 10 minutes in a hot air drier at 120° C.

Measurement of the frame and back lid by DSC in the same manner as in Example 31 showed a heat of fusion of crystal of 30 mJ/mg. Furthermore, by using the frame and the back lid, an instant film pack was assembled and picture taking by an instant camera in the same manner as in Example 31 was tried, which showed no abnormality and the picture taking could be performed smoothly.

Example 35

A mixture of 90 mass parts of pellets of poly lactic acid having an L-lactic acid with optical purity of 88%, 0.1 mass part of carbon black, and 10 mass parts of carbon fiber was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 133,000 and a water content of 420 ppm.

The pellets were fed to an injection molding machine to produce a frame 3 and a back lid 5 of an instant film pack 1 as shown in FIG. 1. The frame and the back lid were annealed for 5 minutes in a hot air drier at 120° C.

Measurement of a heat of fusion of crystal of the frame and back lid by DSC was tried in the same manner as in Example 31 but the measurement could not be made and the crystals generated by annealing were under measurement. Furthermore, an instant film pack was assembled by using the frame and the back lid and picture taking by an instant camera was tried in the same manner as in Example 31. However, the upper light-shielding sheet could not be discharged so that subsequent picture taking was impossible.

Example 36

A mixture of 90 mass parts of pellets of poly lactic acid having an L-lactic acid with optical purity of 90%, 0.1 mass part of carbon black, and 10 mass parts of carbon fiber was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 133,000 and a water content of 460 ppm.

The pellets were fed to an injection molding machine to produce a frame 3 and a back lid 5 of an instant film pack 1 as shown in FIG. 1. The frame and back lid were annealed for 5 minutes in a hot air drier at 110° C.

Measurement of the frame and back lid by DSC was tried in the same manner as in Example 31 but the measurement could not be made and the crystals generated by annealing were under. Furthermore, an instant film pack was assembled by using the frame and the back lid and picture taking by an instant camera was tried in the same manner as in Example 31. However, the upper light-shielding sheet could not be discharged so that subsequent picture taking was impossible.

Example 37

A mixture of 98 mass parts of pellets of poly lactic acid having an L-lactic acid with optical purity of 90%, 0.1 mass part of carbon black, and 2 mass parts of glass fiber was dried in a hot air drier at 80° C. for 6 hours and then kneaded by using a twin-screw kneader to form pellets. The pellets were again dried in a hot air drier at 80° C. for 6 hours. Then, measurement of the pellets showed a weight average molecular weight of poly lactic acid therein of 128,000 and a water content of 400 ppm.

The pellets were fed to an injection molding machine to produce a frame 3 and a back lid 5 of an instant film pack 1 as shown in FIG. 1. Annealing treatment the frame and the back lid for 5 minutes in a hot air drier at 120° C. was tried but the frame and the back lid was deformed fiercely in annealing, so that they could not be assembled into an instant film pack. Furthermore, measurement of the frame and back lid by DSC in the same manner as in Example 31 showed a heat of fusion of crystal of 35 mJ/mg.

Example 38

A mixture of 85 mass parts of pellets of poly lactic acid having an L-lactic acid with optical purity of 98%, 0.1 mass part of carbon black, and 15 mass parts of glass fiber was not dried and then kneaded by using a twin-screw kneader to form pellets. The pellets were dried in a hot air drier at 80° C. for 6 hours. Measurement of the pellets showed a weight average molecular weight of poly lactic acid therein of 87,000 and a water content of 450 ppm.

The pellets were fed to an injection molding machine to produce a frame 3 and a back lid 5 of an instant film pack 1 as shown in FIG. 1. The frame and back lid were annealed for 5 minutes in a hot air drier at 120° C.

Measurement of the frame and back lid by DSC in the same manner as in Example 31 showed a heat of fusion of crystal of 40 mJ/mg. Furthermore, by using the frame and the back lid, an instant film pack assembling was tried. However, the frame and the back lid were brittle and broken when force was applied, so that no instant film pack could be assembled.

Example 39

A mixture of 85 mass parts of pellets of poly lactic acid having an L-lactic acid with optical purity of 98%, 0.1 mass part of carbon black, and 15 mass parts of glass fiber was dried in a hot air drier at 80° C. for 6 hours and then kneaded by using a twin-screw kneader to form pellets. Measurement of the pellets showed a weight average molecular weight of poly lactic acid therein of 128,000 and a water content of 1,600 ppm.

The pellets were not dried and fed to an injection molding machine to produce a frame 3 and a back lid 5 of an instant film pack 1 as shown in FIG. 1. The frame and back lid were annealed for 5 minutes in a hot air drier at 120° C.

Measurement of the frame and back lid by DSC in the same manner as in Example 31 showed a heat of fusion of crystal of 41 mJ/mg. Furthermore, by using the frame and the back lid, an instant film pack assembling was tried. However, the frame and the back lid were brittle and broken when force was applied, so that no instant film pack could be assembled.

TABLE 4

| | Poly lactic acid | | Reinforcing fiber | | Water content (ppm) | Anneal treatment | Heat of fusion of crystal (mj/mg) | Result |
|---|---|---|---|---|---|---|---|---|
| | optical purity (%) | Weight average molecular weight | Kind | Blending ratio (mass %) | | | | |
| Example 31 | 98 | 130000 | Glass fiber | 15 | 450 | 120° C. × 5 min | 38 | OK |
| Example 32 | 98 | 135000 | Carbon fiber | 10 | 600 | 120° C. × 10 min | 40 | OK |
| Example 33 | 98 | 160000 | Carbon fiber | 5 | 1100 | 120° C. × 5 min | 35 | OK |
| Example 34 | 95 | 125000 | Glass fiber | 20 | 400 | 120° C. × 10 min | 30 | OK |
| Example 35 | 90 | 133000 | Carbon fiber | 10 | 420 | 120° C. × 5 min | — | Impossible to discharge |
| Example 36 | 93 | 133000 | Carbon fiber | 10 | 460 | 120° C. × 5 min | — | Impossible to discharge |
| Example 37 | 93 | 128000 | Glass fiber | 2 | 400 | 120° C. × 5 min | 35 | Deformation during annealing |
| Example 38 | 98 | 87000 | Glass fiber | 15 | 450 | 120° C. × 5 min | 40 | Brittle |
| Example 39 | 98 | 128000 | Glass fiber | 15 | 1600 | 120° C. × 5 min | 41 | Brittle |

The resin molded article of the present invention retains various functions and performances required as a resin molded member and component and also sufficient heat resistance and hence it gives no adverse influence to the functions or performances of surrounding members, components, etc., and it can sufficiently exhibit its functions required as a member and it gives less adverse influence to the environment when it is discarded even when exposed to high temperature atmosphere. In particular, a resin molded article can be obtained that is not deformed or deteriorated of its performances as a member for a recording material, when it is temporarily left to stand in a high temperature environment such as in an automobile in a daytime in summer seasons and heated to a high temperature, and that is ultimately decomposed by microorganisms even when it is left to stand in nature, without causing any problems on the environment. Furthermore, in a photographic sensitive material, constituting various members and components, including spools for negative films or reversal films of various standards, body containers, or housing containers, lids, etc. constituent members such as cases for instant film packs (for example, constituent members or components of container bodies, light-shielding sheets, elastic plates, flexible light-shielding sheets, a light-shielding piece, and a bottom light-shielding sheet), casing of a film with a lens, interior mechanical components and the like, as resin molded articles of the present invention results in that the members and components will not be deformed when exposed to high temperature environments such as in an automobile in summer seasons and can exhibit desired functions. In addition, they can be reused as resins and further they do not give adverse influence to the environment when they are discarded so that the present invention is effective in environmental protection.

Furthermore, the foresaid resin molded article can be produced by the method of the present invention.

What is claimed is:

1. A production method for a resin molded article, comprising heat-molding a molding material containing a reinforcing fiber and a biodegradable resin to obtain a molded article having a temperature-lowering crystallization peak temperature of in a range of 80 to 120° C., and subjecting the molded article to an annealing treatment at 80 to 165° C. for 0.1 to 30 minutes to produce a resin molded article containing poly lactic acid having a weight average molecular weight of 50,000 or more and less than 120,000 and an L-lactic acid with optical purity of 95% or more, and a reinforcing fiber in a mass ratio of poly lactic acid/reinforcing fiber of 95/5 to 50/50 so as to have a water content of less than 200 ppm.

2. A production method for a resin molded article according to claim 1, wherein the biodegradable resin is at least one selected from the group consisting of poly lactic acid, polybutylene succinate, polyethylene succinate, modified polyethylene terephthalate, polyhydroxy butyrate, modified starch, and polycaprolactone.

3. A production method for a resin molded article according to claim 1, wherein the biodegradable resin comprises 50 mass % or more of poly lactic acid based on the total biodegradable resin.

4. A production method for a resin molded article according to claim 3, wherein the poly lactic acid comprises 10% or less of a D-lactic acid based on the total poly lactic acid.

5. A production method for a resin molded article according to claim 3, wherein the poly lactic acid comprises 5% or less of a D-lactic acid based on the total poly lactic acid.

6. A production method for a resin molded article according to claim 1, wherein the reinforcing fiber is added in a proportion of 5 to 30 mass % based on the sum of the biodegradable resin and the reinforcing fiber.

7. A production method for a resin molded article according to claim 1, wherein the reinforcing fiber is added in a proportion of 10 to 20 mass % based on the sum of the biodegradable resin and the reinforcing fiber.

8. A production method for a resin molded article according to claim 1, wherein the water content in the molding material is adjusted before the heat molding.

9. A production method for a resin molded article according to claim 1, wherein the annealing treatment is performed in a temperature range of from 100 to 1300C.

10. A production method for a resin molded article according to claim 1, wherein the annealing treatment is performed for 0.2 to 10 minutes.

11. A production method for a resin molded article according to claim 1, wherein the annealing treatment is performed for 0.5 to 5 minutes.

12. A resin molded article obtained by controlling a molding material containing poly lactic acid having a weight average molecular weight of 50,000 or more and less than 120,000 and an L-lactic acid with optical purity of 95% or more, and a reinforcing fiber, wherein the reinforcing fiber is a glass or a carbon fiber in a mass ratio of poly lactic acid/reinforcing fiber of 95/5 to 50/50 so as to have a water content of less than 200 ppm, and then injection molding the molding material and further crystallizing it by annealing treatment.

13. A resin molded article obtained by controlling a molding material containing poly lactic acid having a weight average molecular weight of 50,000 or more and less than 120,000 and an L-lactic acid with optical purity of 88% or more, a reinforcing fiber, wherein the reinforcing fiber is a glass fiber or a carbon fiber, and a nucleating agent in a mass ratio of poly lactic acid/reinforcing fiber/nucleating agent of 95/5/0.01 to 50/50/10 so as to have a water content of less than 200 ppm, and then injection molding the molding material.

14. A resin molded article obtained by controlling a molding material containing poly lactic acid having a weight average molecular weight of 120,000 or more and less than 200,000 and an L-lactic acid with optical purity of 88% or more, a reinforcing fiber, wherein the reinforcing fiber glass fiber or a carbon fiber, and a nucleating agent in a mass ratio of poly lactic acid/reinforcing fiber/nucleating agent of 95/5/0.01 to 50/50/10 so as to have a water content of 200 to 1,500 ppm, and then injection molding the molding material.

15. A resin molded article obtained by controlling a molding material containing poly lactic acid having a weight average molecular weight of 120,000 or more and less than 200,000 and an L-lactic acid with optical purity of 95% or more, and a reinforcing fiber, wherein the reinforcing fiber is a glass fiber or a carbon fiber, in a mass ratio of 95/5 to 50/50 so as to have a water content of 200 to 1,500 ppm, and then injection molding the molding material and further crystallizing it by annealing treatment.

16. A production method for a resin molded article, comprising heat-molding a molding material containing a reinforcing fiber, a nucleating agent, and a biodegradable resin to obtain a molded article having a temperature-lowering crystallization peak temperature of in a range of 80 to 120C., and subjecting the molded article to an annealing treatment at 80 to 165C. for 0.1 to 30 minutes to produce a resin molded article containing poly lactic acid having a weight average molecular weight of 50,000 or more and less than 120,000 and an L-lactic acid with optical purity of 88% or more, a reinforcing fiber, wherein the reinforcing fiber is a glass fiber or a carbon fiber, and a nucleating agent in a mass ratio of poly lactic acid/reinforcing fiber/nucleating agent of 95/5/0.01 to 50/50/10 so as to have a water content of less than 200 ppm, and then injection molding the molding material.

17. A production method for a resin molded article according to claim 16, wherein the biodegradable resin is at least one selected from the group consisting of poly lactic acid, polybutylene succinate, polyethylene succinate, modified polyethylene terephthalate, polyhydroxy butyrate, modified starch, and polycaprolactone.

18. A production method for a resin molded article according to claim 16, wherein the biodegradable resin comprises 50 mass % or more of poly lactic acid based on the total biodegradable resin.

19. A production method for a resin molded article according to claim 18, wherein the poly lactic acid comprises 10% or less of a D-lactic acid based on the total poly lactic acid.

20. A production method for a resin molded article according to claim 18, wherein the poly lactic acid comprises 5% or less of a D-lactic acid based on the total poly lactic acid.

21. A production method for a resin molded article according to claim 16, wherein the reinforcing fiber is added in a proportion of 5 to 30 mass % based on the sum of the biodegradable resin and the reinforcing fiber.

22. A production method for a resin molded article according to claim 16, wherein the reinforcing fiber is added in a proportion of 10 to 20 mass % based on the sum of the biodegradable resin and the reinforcing fiber.

23. A production method for a resin molded article according to claim 16, wherein the water content in the molding material is adjusted before the heat molding.

24. A production method for a resin molded article according to claim 16, wherein the annealing treatment is performed in a temperature range of from 100 to 130C.

25. A production method for a resin molded article according to claim 16, wherein the annealing treatment is performed for 0.2 to 10 minutes.

26. A production method for a resin molded article according to claim 16, wherein the annealing treatment is performed for 0.5 to 5 minutes.

* * * * *

UNITED STATES PATENT AND TRADEMARK OFFICE
CERTIFICATE OF CORRECTION

PATENT NO.        : 7,108,820 B2
APPLICATION NO. : 10/208805
DATED             : September 19, 2006
INVENTOR(S)       : Fumiyuki Suzuki and Tadashi Mochizuki It is certified that error appears in the above-identified patent and that said Letters Patent is hereby corrected as shown below:

Delete claim 1: Col. 28, line 32, and insert:

1. A production method for a resin molded article, comprising heat-molding a molding material containing a reinforcing fiber and a biodegradable resin to obtain a molded article having a temperature-lowering crystallization peak temperature of in a range of 80 to 120°C, and subjecting the molded article to an annealing treatment at 80 to 165°C for 0.1 to 30 minutes to produce a resin molded article containing poly lactic acid having a weight average molecular weight of 50,000 or more and less than 120,000 and an L-lactic acid with optical purity of 95% or more, and a reinforcing fiber in a mass ratio of poly lactic acid/reinforcing fiber of 95/5 to 50/50 so as to have a water content of less than 200 ppm, wherein the reinforcing fiber is a glass fiber or a carbon fiber.

Delete claim 9: Col. 29, line 6, and insert:

9. A production method for a resin molded article according to claim 1, wherein the annealing treatment is performed in a temperature range of from 100 to ~~1300C~~ 130°C.

Delete claim 12: col. 29, line 15, and insert:

12. A resin molded article obtained by controlling a molding material containing poly lactic acid having a weight average molecular weight of 50,000 or more and less than 120,000 and an L-lactic acid with optical purity of 95% or more, and a reinforcing fiber, wherein the reinforcing fiber is a glass fiber or a carbon fiber, in a mass ratio of poly lactic acid/reinforcing fiber of 95/5 to 50/50 so as to have a water content of less than 200 ppm, and then injection molding the molding material and further crystallizing it by annealing treatment.

Delete claim 14, col. 29, line 35, and insert:

14. A resin molded article obtained by controlling a molding material containing poly lactic acid having a weight average molecular weight of 120,000 or more and less than 200,000 and an L-lactic acid with optical purity of 88% or more, a reinforcing fiber, wherein the reinforcing fiber is a glass fiber or a carbon fiber, and a nucleating agent in a mass ratio of poly lactic acid/reinforcing fiber/nucleating agent of 95/5/0.01 to 50/50/10 so as to have a water content of 200 to 1,500 ppm, and then injection molding the molding material.

UNITED STATES PATENT AND TRADEMARK OFFICE
CERTIFICATE OF CORRECTION

PATENT NO. : 7,108,820 B2
APPLICATION NO. : 10/208805
DATED : September 19, 2006
INVENTOR(S) : Fumiyuki Suzuki and Tadashi Mochizuki It is certified that error appears in the above-identified patent and that said Letters Patent is hereby corrected as shown below:

Delete claim 16: col. 29, line 54, and insert:

16. A production method for a resin molded article, comprising heat-molding a molding material containing a reinforcing fiber, a nucleating agent, and a biodegradable resin to obtain a molded article having a temperature-lowering crystallization peak temperature of in a range of 80 to ~~120C.~~ 120°C, and subjecting the molded article to an annealing treatment at 80 to ~~165C.~~ 165°C for 0.1 to 30 minutes to produce a resin molded article containing poly lactic acid having a weight average molecular weight of 50,000 or more and less than 120,000 and an L-lactic acid with optical purity of 88% or more, a reinforcing fiber, wherein the reinforcing fiber is a glass fiber or a carbon fiber, and a nucleating agent in a mass ration of poly lactic acid/reinforcing fiber/nucleating agent of 95/5/0.01 to 50/50/10 so as to have a water content of less than 200 ppm, and then injection molding the molding material.

Delete claim 24: col. 30, line 45, and insert:

24. A production method for a resin molded article according to claim 16, wherein the annealing treatment is performed in a temperature range of from 100 to ~~130C~~ 130°C.

Signed and Sealed this

Sixth Day of February, 2007

JON W. DUDAS
*Director of the United States Patent and Trademark Office*